Dec. 25, 1928.

W. F. IRRGANG 1,696,847

STITCHING DEVICE

Filed April 11, 1927 3 Sheets-Sheet 1

INVENTOR.
William F. Irrgang
BY
Edward C. Taylor
ATTORNEY.

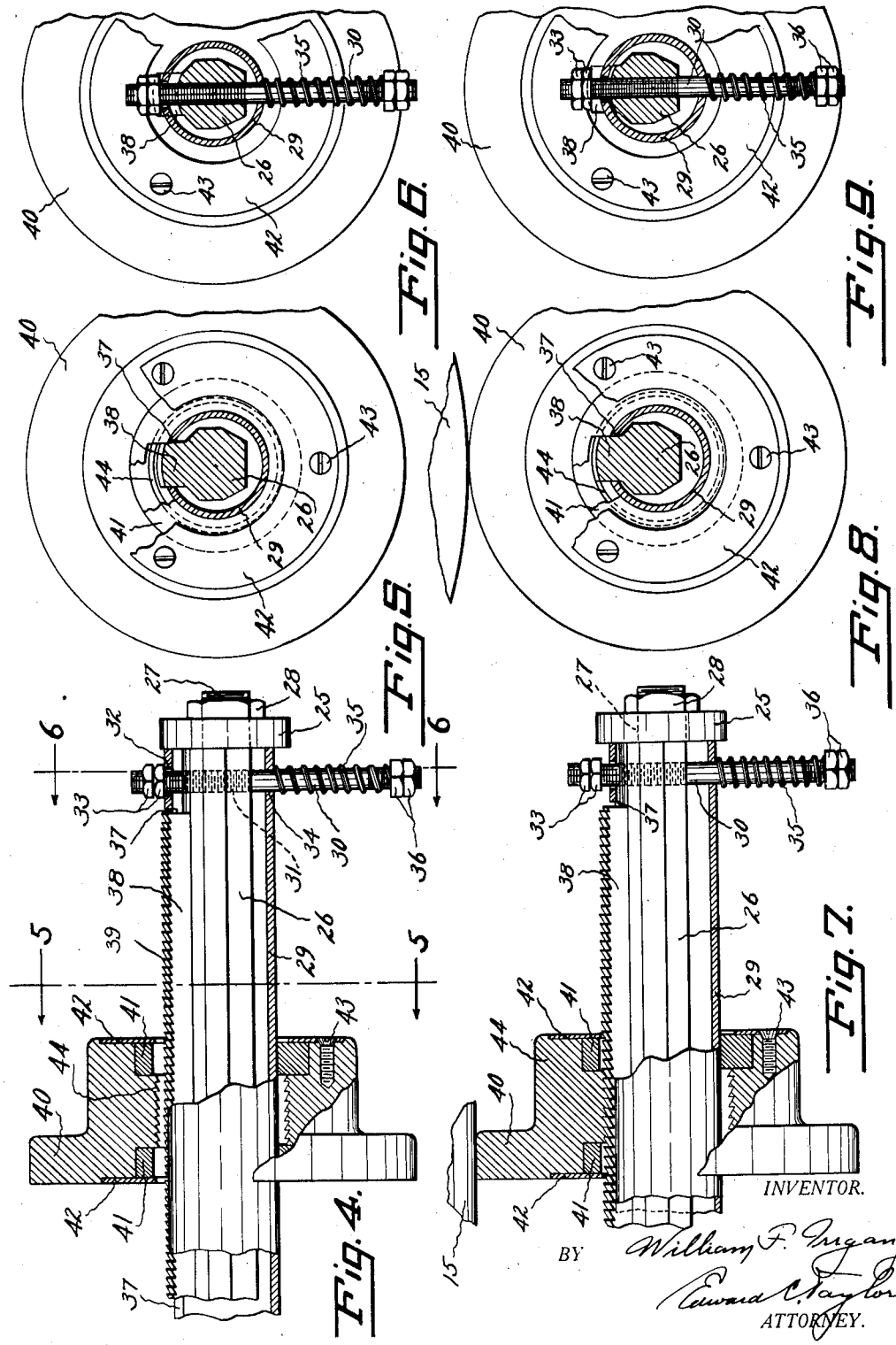

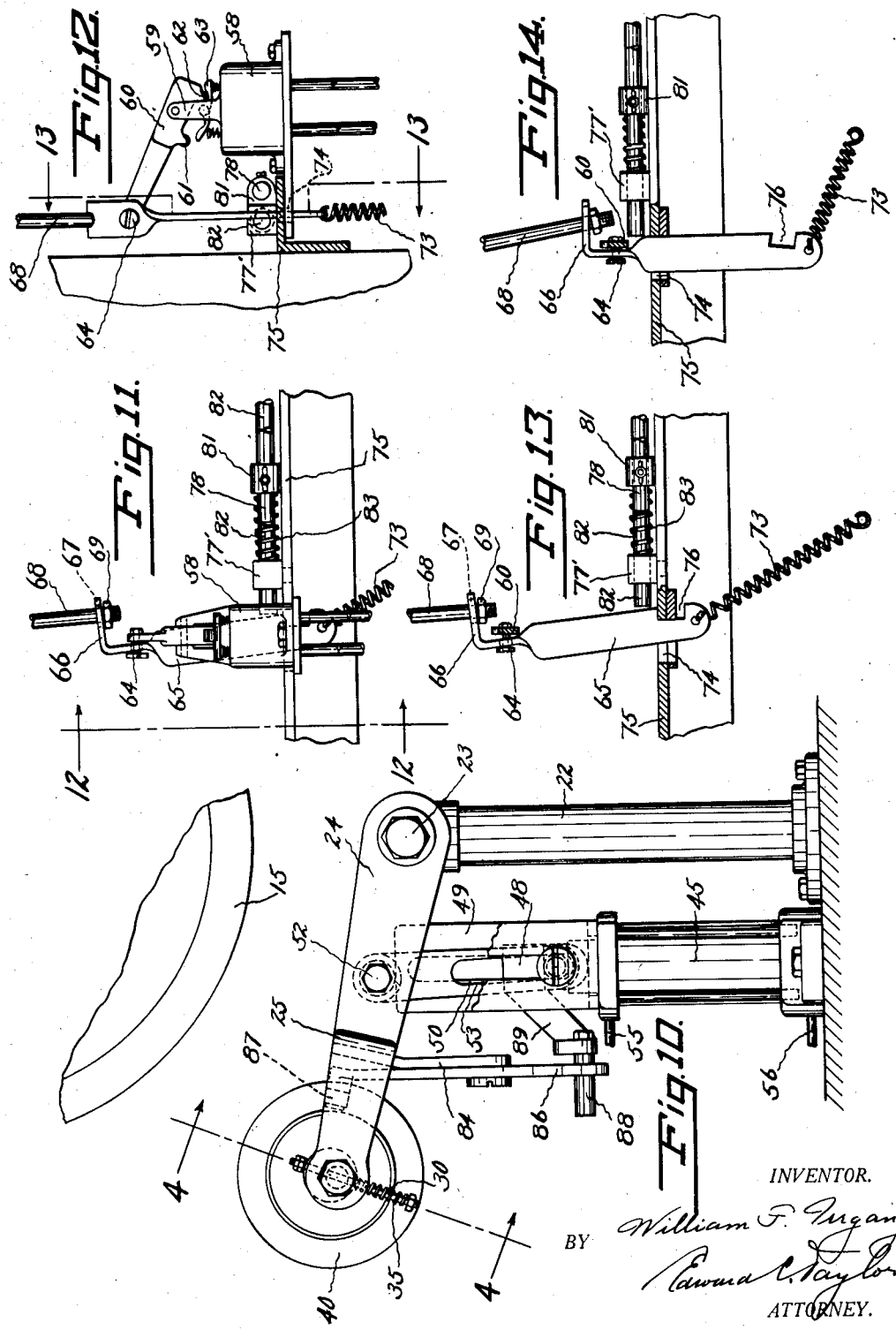

Patented Dec. 25, 1928.

1,696,847

UNITED STATES PATENT OFFICE.

WILLIAM F. IRRGANG, OF CHICOPEE, MASSACHUSETTS, ASSIGNOR TO THE FISK RUBBER COMPANY, OF CHICOPEE FALLS, MASSACHUSETTS, A CORPORATION OF MASSACHUSETTS.

STITCHING DEVICE.

Application filed April 11, 1927. Serial No. 182,754.

This invention relates to a device for stitching or rolling down the fabric plies or the rubber tread portion of a tire in the building of pneumatic tire casings upon a flat drum. It has for its object the provision of a device of this character which will exert pressure progressively from the center of the fabric ply or of the covering rubber toward the edges. It has for a further object the provision of a device which will exert a greater unit pressure than can be obtained with the usual roller covering the entire surface of the ply of material being operated upon. It has for a further object the elimination of the necessity of the operator giving detailed attention to the operation of the device, the stitching rolls of the present invention operating and returning to their initial inactive position automatically, leaving the operator free to perform other operations upon the tire.

Referring to the drawings,

Fig. 4 is a detail of one of the stiching rollers and its supporting mechanism, partly in longitudinal section;

Fig. 5 is a section of line 5—5 of Fig. 4;

Fig. 6 is a section on line 6—6 of Fig. 4;

Figs. 7, 8, and 9 are, respectively, similar to Figs. 4, 5, and 6, but show the parts in different positions.

Figures 1, 2:
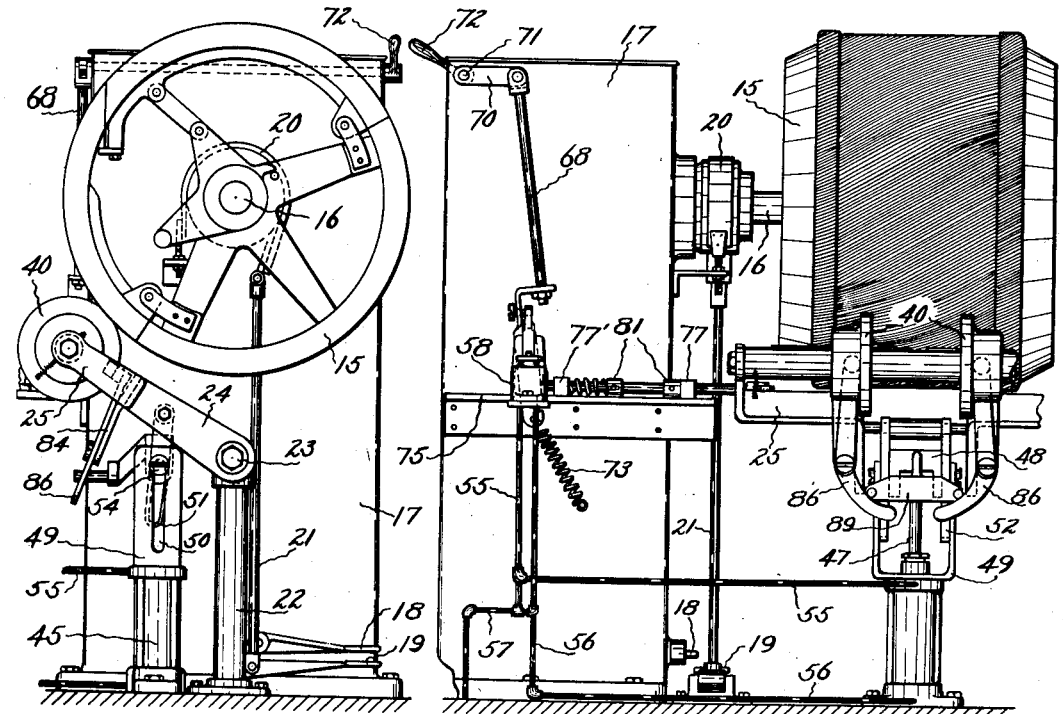
Fig. 1 is a side elevation of a tire building machine embodying my invention.
Fig. 2 is a front elevation thereof.

Fig. 10 is a detail of parts shown in Fig. 1, but drawn to a larger scale and showing the parts in different positions.

Fig. 11 is a detail on a larger scale of certain parts shown in Fig. 2;

Fig. 12 is a section on line 12—12 of Fig. 11; and

Figs. 13 and 14 are sections on line 13—13 of Fig. 12 showing the parts in two different positions.

The invention has been illustrated as applied to a tire building machine employing a drum 15 mounted upon a shaft 16 which is supported for rotation in a frame 17. A treadle 18 controls a suitable source of power furnishing rotation to shaft 16 in a well understood manner, and a treadle 19 operates a brake 20 through a link 21 in order to stop the rotation of shaft 16 and consequently of drum 15 when desired. The drum 15 is preferably of a collapsible construction to permit the removal of the tires built thereon, but as this type of drum is well known in the art a description has been omitted.

The stitcher mechanism is supported upon a pedestal 22 which has at its upper end a pivot mounting 23 supported by arms 24 carrying a yoke 25 at their outer ends. Between the ends of this yoke (see particularly Figs. 3 and 4) is mounted a rod 26 having reduced ends 27 passing through the yoke and clamped by nuts 28. Likewise mounted between the ends of the yoke and surrounding the rod 26 is a tube 29 of such length that it has a sliding fit between the adjacent surfaces of the yoke. This tube is held in place at each end by a bolt 30 threaded at 31 into the rod and extending loosely through a hole 32 in the tube. Lock nuts 33 serve to determine the position of the bolts relative to the tube and thus to determine the position of the tube relative to the rod 26. Diametrically opposite the holes 32 are holes 34 in which the bolts have a sliding fit. A spring 35 surrounds each of the bolts bearing at one end against the tube 29 and at the other against lock nuts 36, allowing the tube to be displaced transversely of the rod against the force of the springs.

In the tube is a longitudinal slot 37 through which projects a rib 38 formed on the rod and serving as a key to keep the tube from rotation. The rib bears threads 39 on its outer surface, right and left handed dividing at the center, and preferably of the buttress or of the Harvey grip type so as to give a maximum strength in one direction and to permit slippage in the other. When the tube is displaced relative to the rod the screw threads project through the slot 37 as is clearly shown by a comparison of Figs. 5 and 8.

The stitching wheels 40, of which there are two mounted face to face, are mounted so as to rotate and slide upon the tube 29. For this purpose the stitching wheels are provided with bushings 41 having grooves fitting over the ribs 38 to prevent rotation and having a loose fit in the stitching rollers so that the latter may have free rotation. The bushings are retained in the stitching wheels by plates 42 secured to the rolls by screws 43. Each stitching roll has an internally threaded portion 44, which, when the tube 29 is displaced to cause the rib 38 to project, engages with the threaded portion 39 of the rib.

Figure 3:
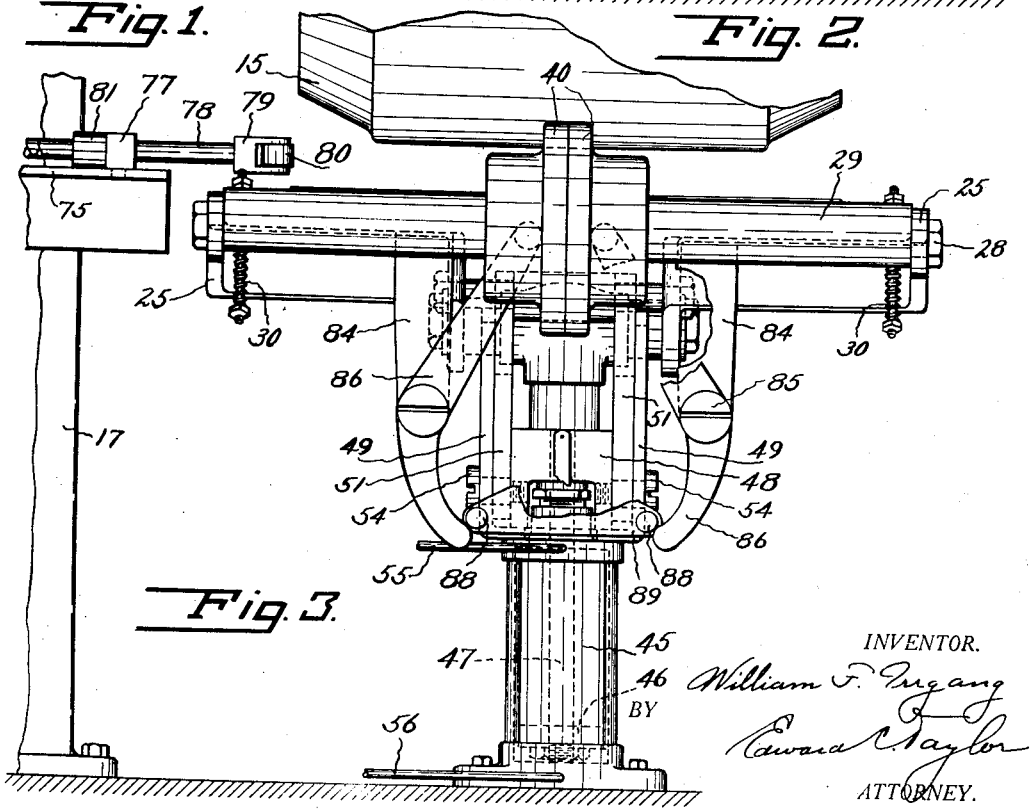
Fig. 3 is a detail corresponding to Fig. 2, but taken on a larger scale and showing the stitching rollers in a different position.

The operation of that portion of the device already described will be clear from a comparison of Figs. 10 and 1, and 4 and 7, respectively. Fig. 10, as well as Fig. 4, shows the stitching device in its inactive position; with the stitching rolls 40 out of contact with the tire building drum 15. By means to be described the yoke 25 may be swung to force the stitching rolls 40 into contact with the material on the drum 15, as indicated in Figs. 1, 7 and 8. The pressure exerted by the rolls on the drum, or perhaps more accurately the reaction of the drum on the stitching rolls, forces the tube 29 downwardly as viewed in Fig. 7 and allows the rib 38 to project. The threaded portion 44 of the stitching rolls is thus caused to engage with the teeth on the rib. At the time when the stitching rolls are pressed against the drum, they are close together, as shown in Fig. 3; but the action of the right and left hand threads is such as to cause the wheels to move away from each other as indicated in Fig. 2. It will be understood that the rotation of the drum 15 is imparted to the stitching rolls and that this source of power alone is used to cause the rolls to rotate and to travel along the threads on the rib 38.

In order to swing the yoke 25, an air cylinder 45 is provided with a piston 46 having a rod 47 connected to it. At the upper end of this rod is a cross head of an inverted U-shape. Extending upwardly from the top of the cylinder 45 and at the sides of the cross head are guides 49 having vertical slots 50 therein. Links 51 are pivoted at 52 to the arms 24 and have slots 53 adjacent their lower ends and extending through about half of their length. Studs 54 are screwed into the cross head and pass through the slots in both the links and the guides. As the piston in the air cylinder is raised by the admission of compressed air under it, the cross head, which is guided by the slots in the guides 49, travels upwardly a distance equal to the length of the slots in the links before causing any vertical movement of the yoke 25. When the studs 54 reach the upper end of the slots 53, however, the yoke 25 is caused to rise, pressing the rollers 40 against the drum 15 with a force determined by the pressure of the compressed air used. The lost motion connection provided by the slots 53 is useful in permitting certain parts to be described later to get out of the way before the rolls 40 start their sidewise motion.

An air pipe 55 is connected to the top of the air cylinder 45 and a pipe 56 to its bottom, whereby the piston may be forced either upwardly or downwardly at will. These pipes, as well as an inlet pipe 57, are connected to an air valve 58 of a standard type. At the top of the valve is secured a bracket 59 to which is pivoted a lever 60 having rollers 61 and 62 fastened on its lower surface. These rollers contact alternately with a rocker 63 likewise pivoted to the bracket 59 and pressing upon the valve plungers to cause either the pipe 55 or the pipe 56 to be connected to the inlet pipe 57. The lever 60 is connected at its free end by a loose pivot 64 with a latch 65 which will be described in more detail below. At the upper end of this latch is a bent portion 66 having a hole 67 in which a rod 68 fits loosely, a nut 69 securing the rod from upward motion through the hole. The upper end of rod 68 is connected to an arm 70 on a pivot shaft 71, carrying at a point convenient to the operator a handle 72. A spring 73 connected between the bottom of the latch 65 and a fixed point on the frame 17 constantly urges the latch downwardly and holds the bent end 66 in contact with the nut 69. The latch passes through a slot 74 in a shelf 75 secured to the frame 17 and has a notched portion 76 co-acting with the edge of the slot to hold the latch in the vertical position of Fig. 13. It will be observed that the spring 73 is set at an angle so that its normal tendency is to hold the latch with its notched portion 76 engaging that edge of the slot to the right as viewed in Fig. 13. In this position of the latch the arm 60 is set so as to admit air into the bottom of the air cylinder 45 and to keep the rollers 40 constantly in contact with the tire building drum 15.

The following mechanism is provided to release the latch 65 and consequently to reverse the action of the valve 68 and admit air to the top rather than to the bottom of the air cylinder when the stitching rolls 40 have become separated to the desired extent. For this purpose guide 77 is fixed to the shelf 75 and has sliding in it a rod 78 which, at the end near the stitching rollers, bears a yoke 79 in which is pivoted a roller 80. This roller engages with the roller 40 nearest it at a predetermined point. Clamps 81 attach a second rod 82 to the rod 78, the clamps being adjustable so that in effect the rod 82 is simply a slight extension of the rod 78 running in a guide 77' mounted on shelf 75. This is for the purpose of adjusting the effective position of the roller 80 and thereby stopping the mechanism at whatever point is desired. A spring 83 is mounted between the guide 77' and the adjacent clamp 81 in order to urge the roller 80 constantly towards the stitching rollers.

Assuming the stitching rollers to have been brought into contact with the drum 15, as in Fig. 3, and to have started their travel of separation, the rotation of the drum and the consequent separation of the stitching rollers continues until one of them strikes the roller 80. Further motion of the stitching rollers causes the rods 78 and 82, which move together as a unit, to travel to the left in Fig. 3. As indicated by a comparison of Figs. 13 and 14, this motion of the rods results in pushing the latch 65 to the left, it being understood that rod 82 is arranged in line with the latch. As the latch is pushed toward the left its notched portion is disengaged from the edge of the slot 74 and the spring 73 snaps it downwardly into the position of Fig. 14. In this position the lever 60 is swung so as to shut off the supply of air to the bottom of the air cylinder and admit air to the top of the cylinder, thereby causing the stitching rollers to retract into the position of Fig. 10.

Mechanism is also provided to cause the rollers 40 to return to the position of Fig. 3, in which they are closely adjacent each other and are ready to start the stitching or rolling down of a subsequent tire, as an automatic operation during the swinging of the rollers from the active position of Fig. 1 to the inactive position of Fig. 10. Upon brackets 84 joined to the yoke 25 are pivots 85 carrying bent arms 86. As shown in Fig. 10, these arms carry at their upper ends rollers 87 engaging the flanged portion of the stitching rollers 40. The lower end of the arms are shaped so as to contact with pins 88 carried upon a bracket 89 which is supported upon the cross head 48. As the cross head descends to withdraw the stitching rolls from contact with the drum 15, the pins 88 strike the bent lower portion of arms 86 and cause the rollers 87 to approach each other. Since at this time the pressure on the rollers 40 has been released and therefore the spring 35 has forced the tube 29 back to its normal position releasing the rollers from contact with the threaded portion of the ribs 38, the stitching rollers are free to slide upon the tube. Accordingly the approach of rollers 87 causes the stitching rolls to be returned to the central position of Fig. 3.

The general operation of the device will be clear from the above. Assuming a tire carcass partially constructed to be in position on the drum 15 ready to be rolled down, the operator swings the handle 72 so as to admit air to the lower portion of the air cylinder 45. The drum 15 is meanwhile started in rotation by pressure on the treadle 18. The stitching rolls 40 are thus caused to contact with the material on the drum 15 and to start rotation and separation as described. When they have separated to the predetermined extent necessary to cause that one at the left in Fig. 2 to strike the roller 80, the air pressure is reversed, and the rollers 40 are drawn out of contact with the drum and finally caused to return to the central position of Fig. 3 ready for the start of another stitching operation. It will be observed that, with the exception of starting the device in operation, the operator exerts no control over it. He is accordingly left free for the performance of other operations upon the tire or for the preparation of materials subsequently to be applied to the partially constructed casing.

Having thus described my invention, I claim:

1. In combination with a revolving tire building drum, a pair of freely rotatable stitching rollers, means for pressing the rollers against the drum, means for causing the rotation of the rollers due to their contact with the drum, to move the rollers apart, and mechanism automatically operated upon the separation of the rollers to a predetermined degree to remove them from contact with the drum.

2. In combination with a revolving tire building drum, a pair of freely rotatable stitching rollers, means for pressing the rollers against the drum, means for causing the rotation of the rollers due to their contact with the drum to move the rollers apart, mechanism automatically operated upon the separation of the rollers to a predetermined degree to remove them from contact with the drum, and means for causing the rollers to assume a position central to the drum upon movement out of contact therewith.

3. A stitching device adapted for contact with a tire building drum comprising a slotted tube, a rod therein having a right and left threaded rib projecting through the slot in the tube, yielding means connecting the tube and the rod whereby pressure on the tube causes the rib to project further through the slot, a pair of stitching rollers having respectively right and left hand internal threads engaging with the rib when the latter is projected, and bushings slidable upon the tube and upon which the stitching rollers are freely rotatable.

WILLIAM F. IRRGANG.